United States Patent Office 2,842,555
Patented July 8, 1958

2,842,555
METHOD OF PREPARING QUATERNARY SALTS OF AMINO CARBINOLS

Morton Harfenist, Yonkers, and Ernest G. Magnien, Bayside, N. Y., assignors to Burroughs Wellcome & Co. (U. S. A.) Inc., Tuckahoe, N. Y., a corporation of New York No Drawing. Application July 27, 1954
Serial No. 446,167

2 Claims. (Cl. 260—326.5)

This invention relates to a novel method for the preparation of amino carbinol quaternary salts of Formula I. Compounds of this type have been found to possess valuable spasmolytic properties as inhibitors of the action of acetylcholine and particularly in ulcer treatment. The preparations previously known suffer, however, from various drawbacks. In some methods yields are poor and in others the final products are contaminated by impurities difficult to remove. The present invention is concerned with a line of synthesis unencumbered with these disadvantages.

The starting matreial for our process is a cycloalkylphenyl ketone (II) which may be prepared in various ways as by a Friedel-Crafts reaction of hexahydrobenzoyl chloride on benzene or of benzoyl chloride on cyclohexene (followed by dehalogenation). This ketone is then subjected to a Reformatsky reaction to give the hydroxyester III. While this ester might be expected to be extremely subject to dehydration, it is nevertheless possible by suitable procedures to isolate it in over 80% yield.

$$
\begin{array}{cc}
\text{C}_6\text{H}_5\text{CO} & \text{OH} \\
| & | \\
\text{cycloalk} & \text{C}_6\text{H}_5-\text{C}-\text{CH}_2\text{CH}_2\overset{+}{\text{NR}}_3 \;\; \text{X}^- \\
& | \\
& \text{cycloalk} \\
\text{II} & \text{I}
\end{array}
$$

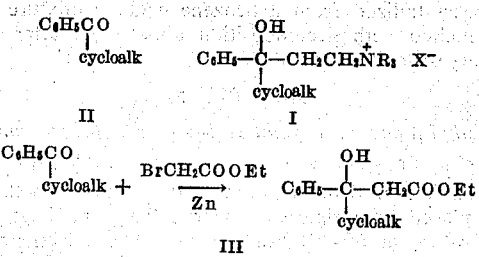

At this point, alternative lines of attack present themselves. The most direct course is to reduce the hydroxyester to a 1-3 glycol (IV). This can be accomplished in quantitative yield by lithium aluminum hydride. Other methods, less convenient or elegant, are reduction with sodium borohydride and catalytic reduction under high pressure and at an elevated temperature.

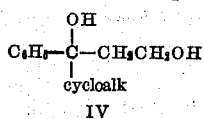

The glycol IV is then converted to a monosulfonic ester (V) by a hydrocarbyl sulfonyl halide. The identity of the sulfonyl halide is not critical, p-toluene sulfonyl chloride, p-bromobenzene sulfonyl chloride, benzene sulfonyl chloride, ethane sulfonyl chloride or methane sulfonyl chloride all suffice. In general, none of these offers marked advantage over p-toluene sulfonyl chloride which is inexpensive and corresponds to the non-toxic p-toluene sulfonic acid.

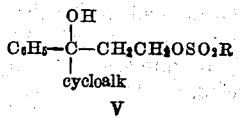

By employing only one equivalent of sulfonyl chloride under mild conditions, the primary alkyl group is unambiguously esterified.

The sulfonic ester, V, is then allowed to react with a tertiary amine, affording the quaternary salt I.

In the preparation of the sulfonic ester V loss may ensue through a side reaction. If after the main reaction is completed, pyridine hydrochloride

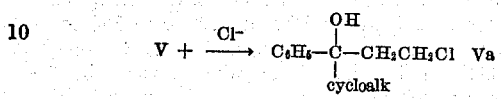

(as a source of chloride ion) is added, Va may become the main product. Since it also can afford I by reaction with a tertiary amine, this at times constitutes a useful variation in the main line of synthesis.

In a second line of synthesis applicable to compounds in which, $$-\overset{+}{\text{NR}}_3 \text{ is } -\overset{\text{R}}{\underset{|}{\text{N}}}(\text{CH}_2)_n$$

with n=4 or 5, begins by the conversion of the hydroxyester, III to an amide. This is accomplished conveniently by dissolving it in methanol containing a primary amine, RNH₂. In this reaction, a catalytic quantity of sodium methoxide is useful, though not essential.

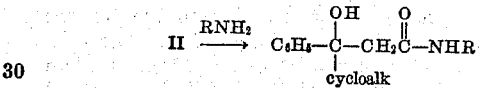

The amide, VI, is then reduced with lithium aluminum hydride to the secondary amine, VII

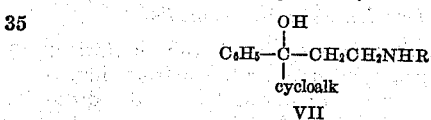

When the secondary amine, VII, is allowed to react with a difunctional alkylating agent $X-(CH_2)_nX$ wherein X represents an active alkylating function such as tetramethylene bromide, pentamethylene bromide or a bis hydrocarbylsulfonate of tetramethylene or pentamethylene glycol in the presence of an acid-binding reagent (such as sodium carbonate) a double alkylation occurs to form the quaternary salt Ia.

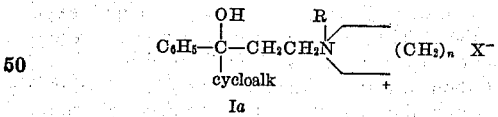

Alternatively the secondary amine may be reacted with a compound $X-(CH_2)_nY$ wherein Y is a group (e. g. OH) convertible into X (X being as before). In such a case there is first formed,

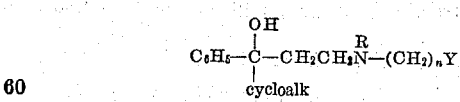

which, on conversion of Y to X can again be cyclized to the quaternary salt Ia.

Still another application proceeds from the situation in which R in VII is H. The operations described above through $X(CH_2)_nX$ then yield a cyclic tertiary amine VIII.

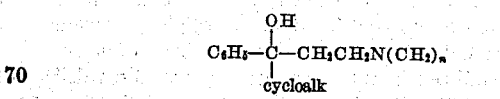

Similarly the sulfonate esters V can be reacted with secondary amines, especially piperidine and pyrrolidine whereby also the tertiary amines VIII are formed.

EXAMPLE 1

*Ethyl β-phenyl-β-cyclohexyl-β-hydroxy propionate*

In a carefully dried 1 liter 3 necked flask with stirrer condenser and dropping funnel was put 39.2 g. of 20 mesh granulated zinc which had been treated with 5% HBr and then washed with water, ethanol and acetone and dried at 55°. It was covered with 50 ml. of dry benzene.

A solution of 93.5 g. of phenyl cyclohexyl ketone and 100 g. of freshly distilled ethyl bromoacetate in 250 ml. of dry benzene was prepared. About 50 ml. of this mixture was added to the zinc. The mixture was stirred rapidly and heated to reflux. When a reaction started, the rest of the solution was added at a rate sufficient to maintain gentle refluxing. The total addition time was one-half hour. The reactants were refluxed two hours more, cooled to room temperature and treated with 131 g. of ammonium chloride in a saturated solution in water. The benzene layer was separated and the aqueous layer was extracted two times with benzene. The combined benzene extracts were washed with saturated aqueous ammonium chloride solution, then with 5% aqueous sodium bicarbonate solution, and then dried over magnesium sulfate. After the removal of the drying agent by filtration, the benzene was distilled to yield 156.5 g. of a light brown crystalline residue melting at 52–55°. This was dissolved in 600 cc. of 95% ethanol and treated with decolorizing charcoal. After filtration to remove the charcoal, water was added to turbidity at 50°. The solution was allowed to cool slowly giving 123 g. of white needle-like crystals having an M. P. of 55–57°. A second crop of 6.1 g. could be obtained from the mother liquors.

EXAMPLE 2

*1-phenyl-1-cyclohexyl-1,3-propanediol*

In a 3 necked, 1 liter, flask equipped with an efficient stirrer, a water-cooled condenser protected from atmospheric moisture by a calcium chloride tube, and a dropping funnel was placed 5.7 g. of lithium aluminum hydride and 200 ml. of anhydrous ethyl ether. The mixture was stirred and 27.5 g. of ethyl β-phenyl-β-hydroxy-β-cyclohexylpropionate dissolved in 150 ml. of anhydrous ethyl ether was added during 45 minutes. The rate of addition was sufficient to cause gentle refluxing of the ether. After this time, 10 ml. of water was added cautiously, then 20 g. of concentrated sulfuric acid dissolved in 200 ml. of water. The reaction mixture separated into two layers, the lower of which was separated and extracted with ether. This and the initial ether layer were combined and washed acid-free with sodium bicarbonate solution, and then washed with water and dried over anhydrous magnesium sulfate. Evaporation of the solvent gave an oil which solidified on standing or seeding with a previously prepared crystal, to give 23.1 g. of a white crystalline solid, which was essentially analytically pure, but could be recrystallized from low-boiling petroleum ether fractions. A recrystallized sample melted at about 94° C.

EXAMPLE 3

*The conversion of 1-phenyl-1-cyclohexyl-1,3-propanediol via 1-phenyl-1-cyclohexyl-3-chloropropanol to N-(3-phenyl - 3 - cyclohexyl - 3 - hydroxypropyl) - N-methyl-pyrrolidinium chloride*

A mixture of 10.25 g. of 1-phenyl-1-cyclohexyl-1,3-propanediol, 8.5 g. of p-toluenesulfonyl chloride, 3.75 g. of pyridine and 100 ml. of dry benzene was heated under reflux for seven hours, and let stand overnight protected by a calcium chloride tube. Some pyridine p-toluene-sulfonate crystallized from the mixture, and was discarded (M. P. 117–119°). To the solution were added 4.3 g. of pyridine hydrochloride and 10 ml. of pyridine, and the mixture was again heated under reflux for 18 hours. The resulting solution of the desired chlorohydroxy compound, pyridine, pyridine p-toluenesulfonate and pyridine hydrochloride was partitioned between benzene and dilute aqueous hydrochloric acid, and the benzene extracts were heated on steam in vacuo to remove the solvent to leave 10.4 g. of an oil. This was transferred to a bottle and 50 ml. of benzene, 100 mg. of phenol, and 8.5 g. of N-methylpyrrolidine were added. The bottle was heated in a steam bath for eight days. A lower layer separated during this time which crystallized on cooling to give 10.6 g. of N-(3-phenyl-3-cyclohexyl-3-hydroxypropyl)-N-methylpyrrolidinium chloride which had the same melting point alone and admixed with an authentic sample of this quaternary compound prepared by an alternative route, and essentially the same antispasmodic activity on the isolated guinea pig gut as did the known sample.

EXAMPLE 4

*1-phenyl-1-cyclohexylpropane-1-ol-3-p-toluenesulfonate*

A stirred solution of 23.4 g. of 1-phenyl-1-cyclohexyl-propane-1,3-diol in 25 ml. of benzene and 31.6 g. of pyridine was treated with a solution of 21 g. of p-toluene-sulfonyl chloride in 50 ml. of benzene, maintaining the temperature between 10 and 20° with cooling water. The mixture from which white crystals soon began to precipitate, was stirred for 6½ hours after the addition had been completed, and was then extracted twice with cold water which had been acidified with enough hydrochloric acid to react with substantially all of the pyridine used. The benzene layer was then extracted with 15% aqueous sodium bicarbonate solution. Removal of the solvent from the benzene solution by vacuum distillation, using steam heat, left 36 g. of residue. This was caused to crystallize by the addition of a pentane fraction of petroleum ether, and melted at 85–94.5°. The product was recrystallized from a benzene pentane mixture and then melted with decomposition about 92°, after preliminary softening about 84°.

EXAMPLE 5

*N-methyl-β-phenyl-β-cyclohexyl-β-hydroxypropionamide*

27.5 g. of ethyl β-phenyl-β-cyclohexyl-β-hydroxypropionate, 6.45 g. of methylamine and 100 ml. of methanol were placed in a tightly stoppered flask and kept at a temperature of 30–40° for 7 days. The solvents were distilled off under reduced pressure and the residue dissolved in 50 ml. warm methanol. Water was added to turbidity and the solution was allowed to cool slowly. On filtration, 25.7 g. of the crystalline amide was obtained, melting 102–108°. Recrystallization from nitromethane gave material melting 114–116°.

EXAMPLE 6

*1-phenyl-1-cyclohexyl-1-hydroxy-3-methylaminopropane*

In a carefully dried 1 liter, 3 necked flask with stirrer, condenser and dropping funnel was put 4.32 g. LiAlH$_4$ and 150 ml. absolute ether. To this was added a suspension of 19.67 g. of N-methyl-β-phenyl-β-cyclohexyl-β-hydroxy propionamide in 300 ml. of absolute ether, at a rate sufficient to maintain gentle refluxing. The mixture was refluxed 4½ hours, then cooled and water was added cautiously to decompose the excess LiAlH$_4$. A saturated aqueous solution of 9 g. of ammonium chloride was added dropwise with stirring and the ether layer was decanted.

The ether layer was extracted with a 5% aqueous hydrochloric acid solution. Evaporation of the aqueous extract gave the hydrochloride of the above-named amine.

The neutral ether extract contained substantially the theoretical amount of unreacted starting amide, which could then be recycled.

EXAMPLE 7

*N-(3-phenyl-3-cyclohexyl-3-hydroxypropyl-)-N-methyl pyrollidinium-p-toluenesulfonate*

In a vial were placed 680 mg. of 3-phenyl-3-cyclohexyl-3-hydroxypropyl-3-p-toluenesulfonate, 220 mg. of N-methylpyrrollidine, and 15 ml. of toluene. The mixture was stoppered and heated at 50° for four days, and at 95° for an additional 2½ days. Removal of the toluene by vacuum distillation left an oil which soon crystallized and could be recrystallized from absolute ethanol and ether, M. P. 168.5–169.5°. It was identical in chemical and biological properties to a sample obtained by another route.

EXAMPLE 8

*N-(3-phenyl-3-cyclohexyl-3-hydroxypropyl)-triethylammonium p-toluenesulfonate*

A mixture of 3.89 g. of 3-phenyl-3-cyclohexyl-3-hydropropyl p-toluenesulfonate, 2.02 g. of triethylamine, 20 ml. of absolute ethanol, and a few milligrams of phenol was heated in a sealed pressure-resistant bottle on a steam bath for 3 days. The solvent and excess amine were then removed by distillation on the steam bath at 20–50 mm. pressure. The remaining viscous oil was dissolved by the addition of a small amount of absolute ethanol, and absolute ether was added to faint turbidity. The addition of a crystal of the product and scratching of the flask caused the product to crystallize.

EXAMPLE 9

*Conversion of N-(3-phenyl-3-cyclohexyl-3-hydroxypropyl)-methylamine hydrochloride to N-(3-phenyl-3-cyclohexyl-3-hydroxypropyl)-N-methylpyrrollidinium bromide*

6.5 g. of the above named methylamine hydrochloride was converted to the free base by solution in water and addition of somewhat over the theoretical amount of aqueous alkali. The free amine was extracted into 200 ml. of benzene, and the benzene solution was put in a 500 ml. flask. A solution of 5.2 g. of 1,4-dibromobutane in 200 ml. of absolute ethanol was added, and 1.6 g. of anhydrous powdered potassium carbonate. The mixture was heated under reflux for 21 hours, cooled, and benzene was added to make the solution about 80% benzene, to render the inorganic salts insoluble. After filtration, the solution was evaporated to a small volume, brought to approximately the initial solvent composition, and then absolute ether was added to faint turbidity, vigorous scratching caused crystallization of the substituted pyrrollidinium bromide, M. P. ca. 191–195°, in analytically pure condition.

We claim:

1. The method of preparing an hydroxy quaternary ammonium salt represented by the formula:

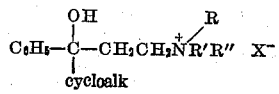

wherein R, R' and R" are selected from the class consisting of lower alkyl groups, and R' and R", when joined in ring form, are selected from the class consisting of the pyrrollidino and piperidino rings, which comprises condensing a phenyl cycloalkyl ketone with an ester of a haloacetic acid to give an hydroxy ester

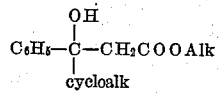

reducing this ester to a glycol,

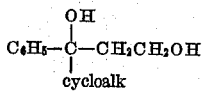

converting the glycol to a mono ester of a hydrocarbylsulfonic acid and reacting this compound with a tertiary amine NRR'R".

2. The method of preparing a quaternary ammonium salt of the formula:

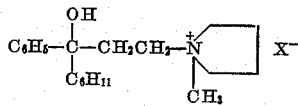

wherein X⁻ is the anion of a non-toxic acid, which comprises condensing phenylcyclohexylketone with zinc and an ester of bromoacetic acid to give the hydroxy ester,

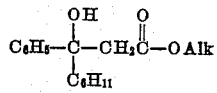

reducing this ester with lithium aluminum hydride to form the glycol,

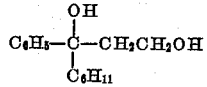

reacting the glycol with p-toluene sulfonyl chloride to make the tosylate, and reacting the tosylate

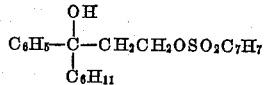

with N-methyl pyrrollidine to produce the desired quaternary salt.

References Cited in the file of this patent

UNITED STATES PATENTS

| | | |
|---|---|---|
| 2,576,103 | Cawley et al. | Nov. 27, 1951 |
| 2,682,543 | Adamson et al. | June 29, 1954 |
| 2,698,325 | Adamson et al. | Dec. 28, 1954 |
| 2,716,121 | Denton | Aug. 23, 1955 |

OTHER REFERENCES

LiAlH₄ Bulletin 401A, page 3, Metal Hydrides, Inc., June 27, 1951.